A. PEARSON.
TROLLEY.
APPLICATION FILED JUNE 1, 1917.
1,284,437.
Patented Nov. 12, 1918.
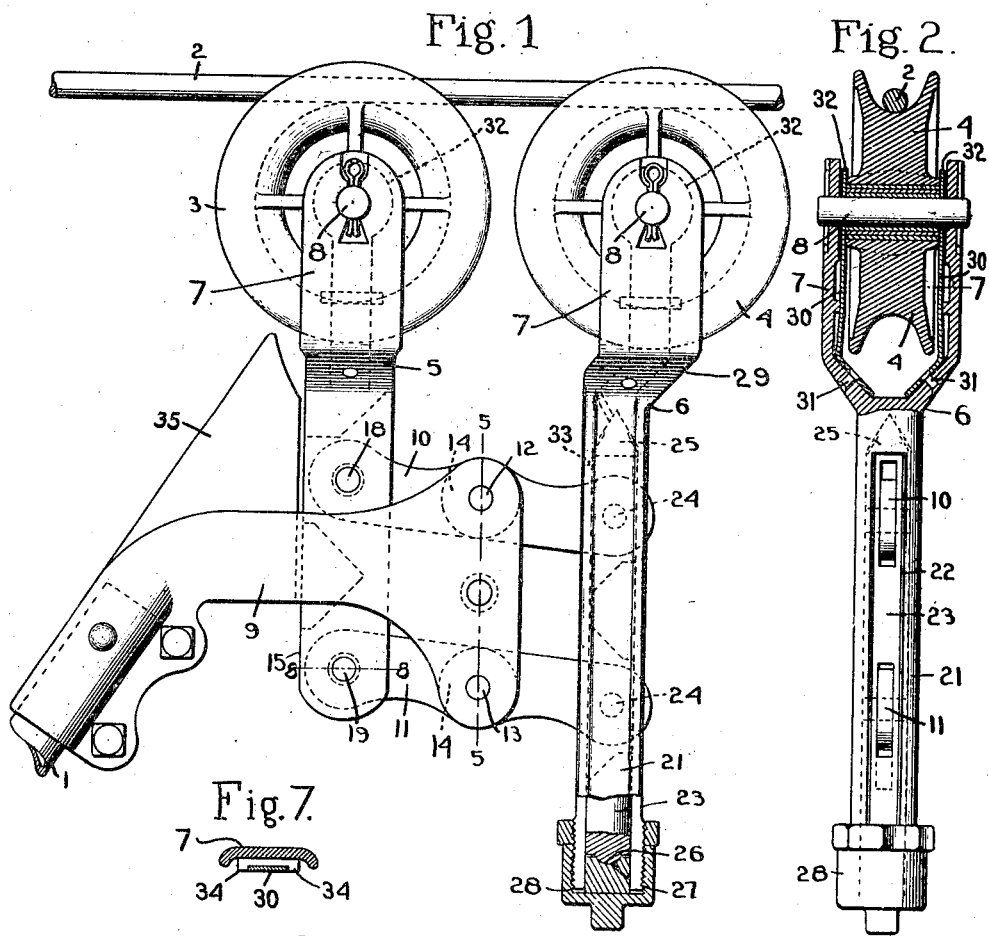
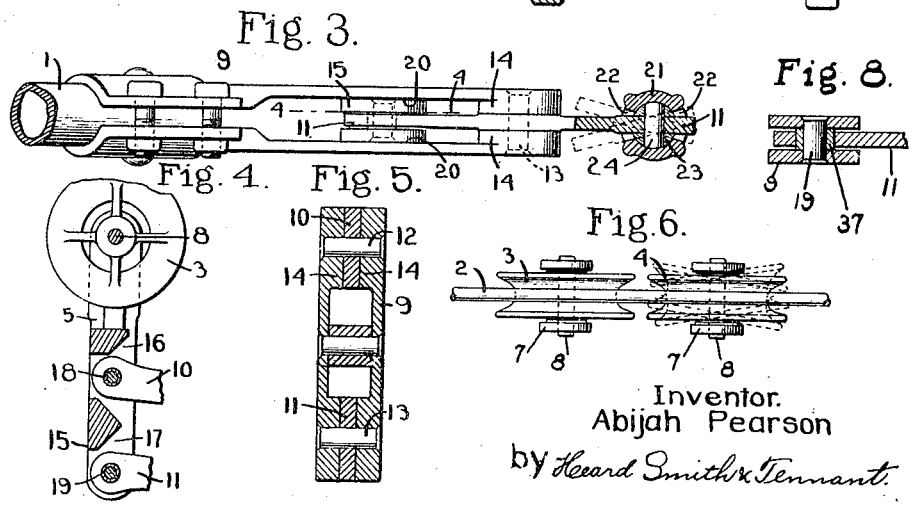
Inventor.
Abijah Pearson
by Heard Smith & Tennant
Attys.

UNITED STATES PATENT OFFICE.

ABIJAH PEARSON, OF BOSTON, MASSACHUSETTS.

TROLLEY.

1,284,437.

Specification of Letters Patent.　　Patented Nov. 12, 1918.

Application filed June 1, 1917.　Serial No. 172,191.

*To all whom it may concern:*

Be it known that I, ABIJAH PEARSON, a citizen of the United States, residing at Boston, county of Suffolk, State of Massachusetts, have invented an Improvement in Trolleys, of which the following description, in connection with the accompanying drawing, is a specification, like characters on the drawing representing like parts.

This invention relates to trolleys of that type which include two trolley wheels having a tandem arrangement, and the object of the invention is to provide a trolley of this type in which each trolley wheel is mounted in a separate harp and in which the two harps are connected to each other and to the trolley pole by a linkage connection which permits the two harps to move relative to the trolley pole, but compels them to move in unison and oppositely.

Other objects of the invention are to provide an improved trolley having novel features which will be hereinafter more fully set forth and then pointed out in the appended claims.

In order to give an understanding of my invention, I have illustrated in the drawings a selected embodiment thereof which will now be described.

Figure 1 is a side view of a trolley embodying my invention;

Fig. 2 is an end view showing the rear trolley wheel in vertical section;

Fig. 3 is a bottom plan view;

Fig. 4 is a section on the line 4—4, Fig. 3;

Fig. 5 is a section on the line 5—5, Fig. 1;

Fig. 6 is a plan view showing the manner in which the rear trolley wheel can turn;

Fig. 7 is a section on the line 7—7, Fig. 2;

Fig. 8 is a section on the line 8—8, Fig. 1.

1 indicates the upper end of a trolley pole which may have any suitable or usual construction and 2 indicates a portion of the overhead conductor or trolley wire with which the trolley has contact. As stated above, the trolley herein shown is of that type having two trolley wheels arranged in tandem, and these trolley wheels are indicated at 3 and 4, respectively, 3 being the front trolley wheel and 4 the rear trolley wheel. Each trolley wheel is supported in an independent harp, the front harp in which the front trolley wheel 3 is mounted being indicated at 5 and the rear harp in which the rear trolley wheel is mounted being indicated generally at 6.

Each harp is formed at its upper end with the usual forked portion 7 in which the trolley wheel is received, and it sustains the usual pivotal pin 8 on which the trolley wheel is rotatably mounted.

30 are the usual contact strips which serve to carry current from the trolley wheel to the trolley harp. These contact strips are rigidly secured to the harp at their lower ends, as shown at 31, and the upper ends 32 of the contact strips are enlarged and are provided with apertures through which the pin 8 extends. Each arm of the harp is provided with two shoulders 34 which engage the opposite edges of the corresponding contact strip 30 and serve to hold it firmly in position.

The trolley pole 1 is provided at its upper end with a rearward extension herein shown in the form of a head or bracket 9 and the two trolley harps 5 and 6 are mounted on said rearward extension and are connected thereto by a linkage connection which permits the harps to move vertically relative to the head or extension. Owing to the fact that the trolley harps are sustained on the rearward extension, both trolley harps will be situated in the rear of the trolley pole. Further the linkage connection for the two harps is so related that the harps are required to move in unison, but in opposite directions, so that when one harp is lowered, the other is raised, and vice versa. This linkage connection comprises the two levers 10 and 11 which are pivotally connected intermediate of their ends to the bracket at 12 and 13, respectively, and to the ends of which the two harps are pivotally connected. The bracket 9 is forked bracket and the levers 10 and 11 are situated between the arms of the fork, said arms being provided with the cheeks or hub portions 14 that fit against the faces of the levers. The trolley harp 5 is provided with a stem or extension 15 formed with two slots or recesses 16 and 17 in which the forward ends of the levers 10 and 11 are received, said levers being pivoted to the stem of the trolley harp at 18 and 19, respectively. The sides of the stem 15 are preferably flattened to provide bearing surfaces that engage the inner faces 20 of the arms of the fork, thus assisting in holding the harp in proper position. The rear harp 6 is pivotally connected to the rear ends of the levers 10 and 11, and the connection is such as to allow said harp to turn about a vertical axis. This rear harp 6 is provided with a tubular stem 21 which is slotted at opposite sides, as shown at 22. Situated within the tubular stem 21 is a pin or bearing member 23 which is slotted to receive the rear ends of the levers 10 and 11, said levers being pivotally connected to the member 23, as shown at 24. The upper end 25 of the bearing member 23 is pointed or tapered and fits a tapered recess in the harp 6. The lower end of the member 23 is provided with a bearing projection 26 which rests on a bearing block 27 that is situated in the lower end of the post 21 and is retained in place by the cap nut 28. The slots 22 are wider than the thickness of the levers 10 and 11, thereby to permit the stem 21 of the harp 6 to have a limited turning movement about the bearing member 23.

The construction illustrated is such that the front trolley wheel 3 stands in line with the trolley pole 1, and the flat faces of the stem 15 bearing against the flat faces 20 of the arms of the forked bracket 9 serve to hold the front trolley wheel 3 always in a definite angular position relative to the trolley pole. The object in having the rear harp swiveled to the levers 10 and 11 is to permit said harp to turn about a vertical axis relative to the front harp and the trolley pole as the trolley is passing over a curve in the trolley wire.

The harp 6 is shown as having the offset portion 29 so that it will have a caster action in following a curve in the trolley wire.

The levers 10 and 11 form with the trolley harps a parallel-ruler motion which maintains said harps at all times in their proper vertical position, but permits them to move vertically relative to the bracket 9. Since the trolley harps are connected to the opposite ends of the levers, they must always move simultaneously but in opposite directions. The advantage of this construction is that it reduces the liability of the trolley to jump the wire in passing over any uneven portions thereof, for if the front trolley wheel 3 strikes any obstruction or kink in the wire which tends to throw it downwardly, the downward movement which is thereby given to the trolley pole will be only one-half that of the trolley wheel, and for this reason there is much less liability of the trolley jumping the wire than if the full downward movement of the trolley wheel were given to the trolley pole. Moreover, with this construction, the force tending to move the trolley pole upwardly is divided between the two trolley wheels 3 and 4, so that each trolley wheel bears against the trolley wire with only one-half the pressure that would result if the trolley pole carried a single trolley wheel. This fact also tends to reduce the liability of the trolley to jump the wire.

The rear trolley harp is somewhat heavier than the front trolley harp, and, as a result, when the trolley is removed from the trolley wire, the greater weight of the rear trolley harp will turn the levers 10 and 11, thus carrying the front trolley harp above the rear trolley harp. This turning movement is limited by engagement of the upper edge of the lever 10 with the edge 33 of the slot 22. The advantage of this construction is that when during the operation of placing the trolley on the wire, said trolley is moved up toward the wire, the front trolley wheel 3 which is in line with the trolley pole will come into contact with the trolley wire first, after which the rear trolley wheel will be brought into contact with the wire.

In the device herein described both trolley harps are situated in the rear of the trolley pole and the axis of the front trolley wheel 3 stands in substantial alinement with the trolley pole. This construction has the advantage that the trolley will follow a curve in the wire without danger of jumping the wire.

35 indicates a guard in the form of a finger or web rising from the bracket 9 and situated in front of the front harp 5. The purpose of this guard is to prevent the trolley wire from striking the front harp or getting caught thereagainst in case the trolley jumps the wire.

For connecting the levers 10 and 11 to the trolley harp, I will preferably employ the construction shown in Fig. 8. As seen in said figure, each lever is provided with a bushing 37 through which the pivotal pin or rivet 19 extends. The bushing 37 is slightly longer than the thickness of the lever so that when the pin or rivet 19 is headed over at its ends, the pressure of the two sides of the trolley harp come on the bushing instead of on the lever. This prevents any binding action.

While I have illustrated herein a selected embodiment of my invention, I do not wish to be limited to the constructional features shown.

I claim:

1. In a trolley, the combination with a trolley pole having at its upper end a rearward extension, of two trolley harps, a trolley wheel carried by each harp, and a linkage connection between each trolley harp and the rearward extension of the trolley pole.

2. In a trolley, the combination with a trolley pole, of two trolley harps, a linkage connection between each harp and the trolley pole which permits each harp to move relative to the pole and compels the harps to move in unison but oppositely, a trolley wheel carried by each harp, said trolley harps being so situated relative to the trolley pole that the front trolley wheel comes substantially in alinement with said trolley pole.

3. In a trolley, the combination with a trolley pole having at its upper end a rearward extension, of two parallel levers, each pivoted intermediate of its ends to said extension, two trolley harps pivotally connected to said levers, and a trolley wheel carried by each trolley harp, said trolley harps being so situated relative to the trolley pole that the front trolley wheel is in substantial alinement with said trolley pole.

4. In a trolley, the combination with a trolley pole having at its upper end a rearward extension, of two parallel levers, each pivoted intermediate of its ends to said extension, a front and a rear trolley harp pivoted to said levers, a trolley wheel carried by each harp, the front trolley wheel being situated substantially in alinement with said trolley pole and the rear trolley harp being capable of turning about a vertical axis relative to said levers.

5. The combination with a trolley pole, of a head or bracket thereon, two parallel levers, each pivoted intermediate of its ends to said bracket, two trolley harps, one pivotally connected to the corresponding ends of both levers and the other pivotally connected to the other ends of said levers, and a trolley wheel carried by each harp.

6. The combination with a trolley pole having a head or bracket at its upper end, of two parallel levers, each pivoted intermediate of its ends to said bracket, a front trolley harp pivotally connected to the front ends of said levers, a rear trolley harp pivotally connected to the rear ends of said levers and also capable of turning about a vertical axis relative thereto, and a trolley wheel sustained by each harp.

7. In a trolley, the combination with a trolley pole having a rearward extension, of two parallel levers, each pivoted to said extension intermediate of its ends, a front trolley harp pivotally connected to the front ends of said levers, a connecting member pivotally connected to the rear ends of said levers, a rear trolley harp having a tubular stem which fits over said connecting member and is capable of limited turning movement thereabout, and a trolley wheel sustained by each trolley harp.

8. In a trolley, the combination with a trolley pole having a head or bracket thereon, of two parallel levers, each pivoted intermediate of its ends to said bracket, a front trolley harp pivoted to the front ends of said levers, a rear trolley harp pivoted to the rear ends of said levers, and a trolley wheel carried by each harp, the rear harp having a greater weight than the front harp.

In testimony whereof, I have signed my name to this specification.

ABIJAH PEARSON.

Copies of this patent may be obtained for five cents each, by addressing the "Commissioner of Patents, Washington, D. C."